(12) United States Patent
Janssen et al.

(10) Patent No.: US 6,299,524 B1
(45) Date of Patent: Oct. 9, 2001

(54) APPARATUS AND METHOD FOR DETECTING BONE FRACTURE IN SLAUGHTERED ANIMALS, IN PARTICULAR FOWL

(75) Inventors: Petrus Chr. H. Janssen, Wilbertoord; Francis W. J. Van Happen, St. Hubert; Adrianus J. van den Nieuwelaar, Gemert, all of (NL)

(73) Assignee: Stork PMT B.V. (NL)

( * ) Notice: Subject to any disclaimer, the term of this patent is extended or adjusted under 35 U.S.C. 154(b) by 0 days.

(21) Appl. No.: 09/447,899

(22) Filed: Nov. 23, 1999

(30) Foreign Application Priority Data

Nov. 26, 1998 (NL) .................................................. 1010656

(51) Int. Cl.⁷ .................................................. A22C 21/00
(52) U.S. Cl. .......................................... 452/198; 606/102
(58) Field of Search ............................. 452/198; 606/102

(56) References Cited

U.S. PATENT DOCUMENTS

| 5,348,009 | * | 9/1994 | Ohtomo et al. | 128/653.1 |
| 5,651,363 | * | 7/1997 | Kaufman et al. | 128/660.02 |
| 5,774,520 | * | 6/1998 | Bolotin | 378/50 |
| 5,873,843 | * | 2/1999 | Draper | 600/587 |

FOREIGN PATENT DOCUMENTS

| 0 819 381 A1 | 1/1998 | (EP) . |
| WO 93/13671 | 7/1993 | (WO) . |

OTHER PUBLICATIONS

Patent Cooperation Treaty (PCT) Report Concerning Novelty Search of International Type issued in priority Netherlands Application No. 1010656.

* cited by examiner

Primary Examiner—Willis Little
(74) Attorney, Agent, or Firm—Kristin L. Johnson; Kilpatrick Stockton LLP

(57) ABSTRACT

Apparatus and method for detecting the presence of a bone fracture in a specific bone of a slaughtered animal or a part thereof, particularly fowl, especially for detecting a bone fracture in the leg bone of fowl, the apparatus comprising:

retention means designed to retain an animal on a retention location thereof, fracture detection means designed for detecting a possible fracture in the relevant bone of the animal, and signalling means which are linked to the fracture detection means and signal whether a bone fracture is or is not present.

31 Claims, 6 Drawing Sheets

APPARATUS AND METHOD FOR DETECTING BONE FRACTURE IN SLAUGHTERED ANIMALS, IN PARTICULAR FOWL

FIELD OF THE INVENTION

The invention relates to the processing of slaughtered animals or parts thereof, in particular of fowl or parts of slaughtered fowl, and in particular to the industrial processing of such animals.

DESCRIPTION OF THE PRIOR ART

As is known, the processing of fowl such as poultry, in particular chicken, in large quantities is mostly automated. It makes use of processing installations comprising a conveyor arrangement which forms a conveyor track for one or more retention members which can be moved along the conveyor track and are designed to carry a bird or one or more parts of birds. Located along the conveyor track are one or more processing stations where the passing bird undergoes processing, for example plucking of the feathers of the bird, making an incision in the bird, etc. An example of a known conveyor arrangement for such a processing installation is described in WO 93/13671, where the retention members are designed for carrying the chickens or chicken parts such as drumsticks and chicken quarters, while suspended from the tarsal joint of a leg.

In practice, the operation of these known automated processing installations is found to be disrupted more often than would be desirable as a result of the leg bone being fractured, usually at a short distance below the tarsal joint retained by the retention member. Thus the drumsticks in practice are taken to a deboning station where the meat is stripped off the drumstick suspended from its tarsal joint. For this purpose, a stripper is made to engage the drumstick near the retention member and is then moved downwards, so that the meat is stripped off. If the leg bone is broken, what will often happen is that instead of the meat being stripped off the bone, part of the drumstick will tear, near the bone fracture, off the part which comprises the tarsal joint and is retained by the retention member. This torn-off part then contains a bone, thus resulting in considerable problems both in the deboning station and in possible further processing stations, so that the installation has to be stopped more often than is desirable to clear the malfunction. Data from practical experience indicate that sometimes about 10% of the drumsticks presented to a deboning station will be subject to the above-described bone fracture.

A similar problem occurs in the processing of pigs, in particular the processing of pigs' legs, where boning takes place by machine and possible fracture in the leg bone can lead to considerable problems and damage, for example jamming of the deboning installation and the pig's ham becoming unsuitable for retail. In particular, the economic damage when a pig's ham is lost is much greater than that caused by the loss of a single drumstick of a chicken.

OBJECT OF THE INVENTION

It is an object of the present invention to overcome the abovementioned problems.

SUMMARY OF THE INVENTION

The invention provides an apparatus according to claim 1.

The bone fracture detection means may comprise, for example, an X-ray camera which is linked to electronic image processing means for processing the image obtained by the camera.

In another variant, the bone fracture detection means comprise a camera which records the shape of an animal or part of the animal and which is linked to electronic image processing means for processing the image obtained by the camera. For example, the image processing means are designed for determining the outer contour of the animal or animal part and to compare this with a predefined standard contour of an animal with an intact bone. This embodiment can be used, for example, to establish whether a wing of a slaughtered bird suspended in a conveyor arrangement by its legs is broken. If the wing is broken it will adopt a different position than if the wing is intact.

In an advantageous embodiment, the signalling means are linked to memory means for storing data regarding the animals or animal parts examined, these data then optionally being used for analytical purposes.

In another advantageous embodiment provision may be made for the signalling means to be linked to facilities positioned upstream of the fracture detection, which handle and/or process the animal, in particular to those facilities which may possibly cause a bone fracture. In particular, this refers to the operations of conveying the animals, where there is a risk of causing a bone fracture, particularly at those points where the animals or parts thereof are placed into a mechanized conveyor means or are transferred from the one mechanized conveyor means to another mechanized conveyor means.

In a further advantageous embodiment, the signalling means are linked to one or more processing facilities for the animal or part thereof which operate downstream of the fracture detection apparatus, so that the activity performed by said processing facility can be tailored to whether a bone fracture is or is not present. Thus it is conceivable for the animal or part thereof, in the event of a bone fracture, not to be processed in a mechanized fashion and to be passed to a station where manual processing takes place.

In a further variant, provision can be made for the bone fracture detection apparatus to be designed for processing a plurality of types of animals and animal parts, for example both for processing drumsticks and considerably larger chicken quarters of chickens. Preferably, means are provided for this purpose which are designed for observing what type of animal or animal part is being presented to the detection apparatus.

An advantageous embodiment of the inventive idea is described in. This arrangement is based on the idea that if no fracture is present in the relevant bone of the animal, this bone and the meat around it will behave as a single entity and will therefore overall exhibit the same reaction as a result of the mechanical load imposed. But if a bone fracture is present, those parts of the animal or part thereof to be examined which are situated on either side of said bone fracture will react differently to the imposed mechanical load. Since the imposed mechanical load is known it is therefore feasible (possibly by experiments) to establish what reaction will occur with an intact bone and in the event of what reaction the bone is fractured.

The mechanical load applied to the animal or part thereof to be inspected can take a variety of forms within the scope of the inventive thought. For example it is possible, by means of procedures involving simple construction, to apply a flexural load to the bone to be inspected, but a torsional load could also be generated. It is also possible for the bone to be inspected to be subjected to a tensile load or compressive load.

In an advantageous embodiment the observing means are designed for establishing, by observing a possible change of the relative orientation of the parts of the animal which are situated on either side of the possible fracture, whether there is a fracture. These observing means can comprise a camera, for example. Obviously, the mechanical load applied should not be so large that the bone to be inspected will fracture as a result of this type bone fracture detection. It may be advantageous, however, for the mechanical load to be such that a partially fractured bone will yet fracture completely or in any case will give rise to a distinctly observable change in the orientation.

The present invention is suitable for use in the processing of fowl and pigs, but obviously the invention can also be used in processing other slaughtered animals.

Advantageous embodiments of the apparatus according to the invention are described in the subordinate claims and in the following description with reference to the drawings.

DETAILED DESCRIPTION OF THE INVENTION

Figure 1:
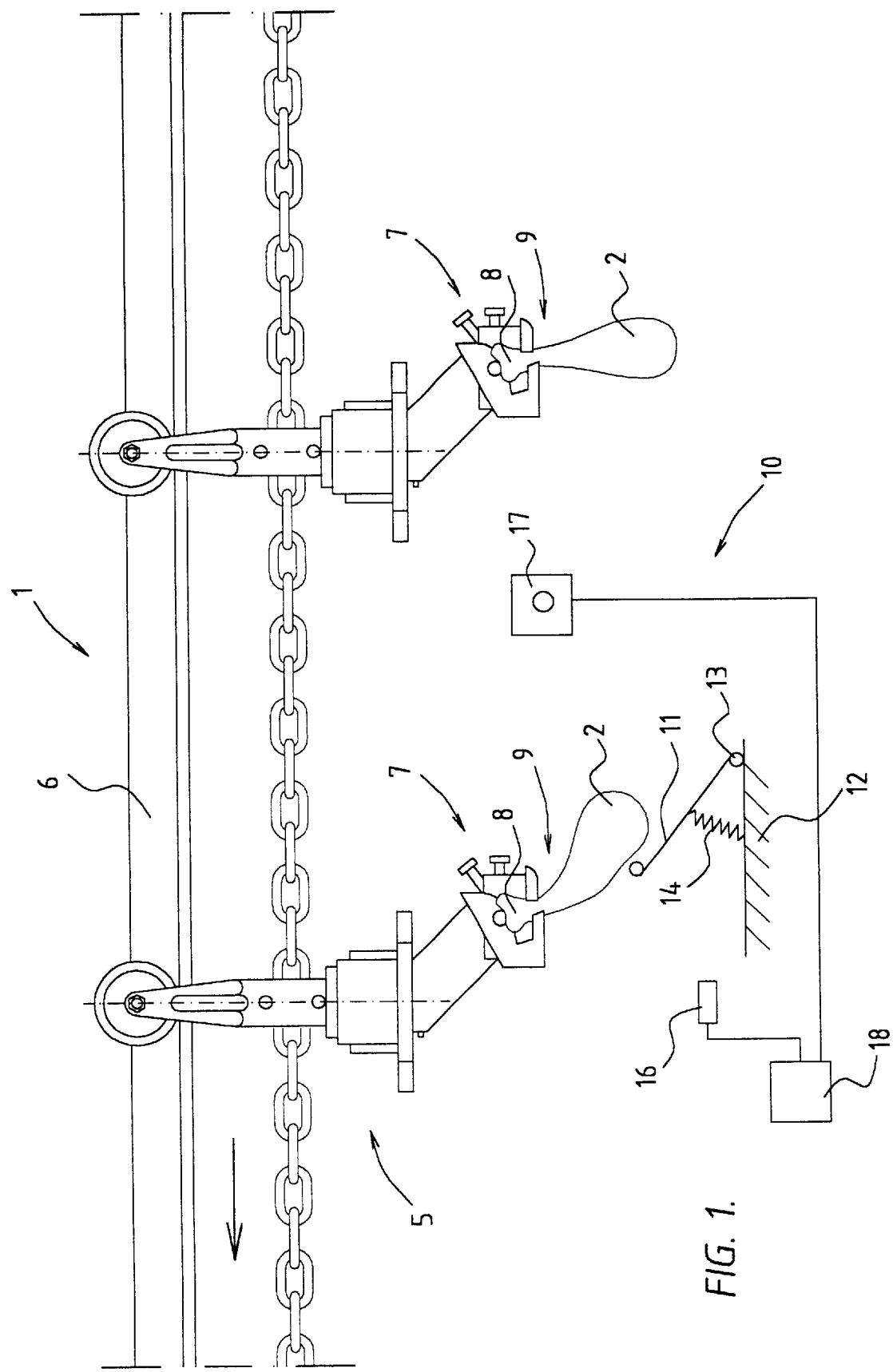
FIG. 1 shows a schematic vertical side view of a first specific embodiment of an apparatus according to the invention.

FIG. 1 shows an apparatus 1 for detecting the presence of a bone fracture in a specific bone of a slaughtered fowl, or of a part of a slaughtered fowl, in this example for detecting a bone fracture in the leg bone of a drumstick 2 of a chicken.

The apparatus 1 comprises a conveyor arrangement 5 which defines a, preferably endless, conveyor track 6 for a plurality of retention means 7 for the drumsticks 2 which are incorporated in the conveyor arrangement 5, can be moved along the conveyor track 6. The conveyor arrangement 5 shown is known per se from the application WO 93/13671, and sections of that application which are relevant for the description and operation of the conveyor arrangement 5 are hereby incorporated in the present application. In particular, the known retention means 7 are designed for carrying the drumstick 2 while suspended by its tarsal joint 8. At the same time, the design of said retention means 7 is such that the leg is encircled annularly at a short distance below the tarsal joint 8. These retention means 7 are further selectively actuable to retain or release the drumstick 2. This embodiment also allows whole chickens and chicken legs to be carried using the same retention means 7, and this is obviously also possible with other fowl.

Not shown are drive means for moving the retention means 7 along the conveyor track 6, said drive means for example engaging the chain between the retention means 7.

Positioned at an observing location along the conveyor track 6 for the drumsticks 2 are mechanical loading means 10 designed for applying a mechanical load to the retained drumsticks 2, so that the relevant leg bone is mechanically loaded at the location of the possible bone fracture. As described earlier, the possibly present bone fracture in the leg bone is suspected, in particular, at a short distance below the tarsal joint, at 9.

In this example, the mechanical loading means 10 comprise an obstacle 11 which is mounted on associated support means, here frame 12 of the apparatus, so as to be able to pivot about axis 13 and which in a detection position thereof (shown in FIG. 1) extends into the trajectory of the drumsticks 2 moved along by the conveyor arrangement 5.

A restoring spring 14 is provided to push the obstacle 11, under a preferably adjustable bias, towards its detection position.

The support means 12, 13 and the restoring spring 14 allow the obstacle 11 to be forced from the detection position by a passing drumstick 2, out of the way of the drumstick 2, if no bone fracture is present in the leg bone. The drumstick 2 then behaves as a stiff entity and will remain in the position where it is held by the retention means 7, although in practice minor pivoting of the drumstick 2 relative to its original position may well occur.

The obstacle 11 being pushed out of the detection position to an extent which can be effected only by an intact drumstick 2 is detected by a sensor 16, for example a proximity or contact switch.

The restoring spring 14 and the support means 12, 13 of the obstacle 11 are further of such design that the obstacle 11 substantially remains in its detection position as a drumstick 2 passes over the obstacle 11, if a bone fracture is present in the leg bone. In that case, the mechanical flexural load applied by the obstacle 11 to the passing drumstick 2 will cause the orientation of the part which comes into contact with the obstacle 11 to be considerably altered relative to that section of the drumstick 2 which is retained by the retention means 7, as can be clearly seen in the left-hand side of FIG. 1. As a result of undergoing deformation, the drumstick 2 now passes the obstacle 11 without the obstacle 11 pivoting away to the extent of this being detected by a sensor 16.

A passage detector 17 detects whether a drumstick 2 arrives at the obstacle 11, thus allowing, if this is the case and detection by the sensor 16 fails to occur, suitably constructed control means 18 to signal that the retention means 7 which have just passed through, are carrying a fractured drumstick 2.

On the basis of this signalling it is possible for the grip by the retention means 7 on the fractured drumstick 2 to be relinquished at a release location (not shown) situated downstream of the obstacle 11 and for the fractured drumstick 2 to be separated from the retention means 7. The fractured drumsticks can then possibly be assessed manually as to whether they are suitable for retail or can, for example, be further processed by hand.

Preferably, a mechanical recovery device is provided at the release location not shown, said recovery device exerting a force on the fractured drumsticks 2 to separate the drumsticks 2 with a fractured bone from the retention means 7. The fractured drumsticks 2 in particular are occasionally found to jam in the retention means, thereby requiring an expulsion force, for example exerted by an expeller which is located along the track and will pivot on command.

Advantageously, the drumsticks 2 are moved along at a considerable velocity, which on the one hand is advantageous for the capacity of the apparatus and on the other hand leads to an impact load on the bone to be inspected.

Although FIG. 1 in the side view shows only one drumstick 2 per retention means 7, it will be evident from the description of the application mentioned earlier that these known retention means 7 can be used to convey two drumsticks 2 next to one another. It is then preferable for separately acting obstacles 11 to be positioned in the two juxtaposed trajectories of the drumsticks and moreover for a separate release location with an appertaining expeller to be positioned downstream thereof for each trajectory.

The apparatus shown of simple design is therefore able to establish, with a high capacity, whether a drumstick is fractured, thus allowing considerable problems to be avoided in the further processing of the drumsticks 2.

Figure 2:
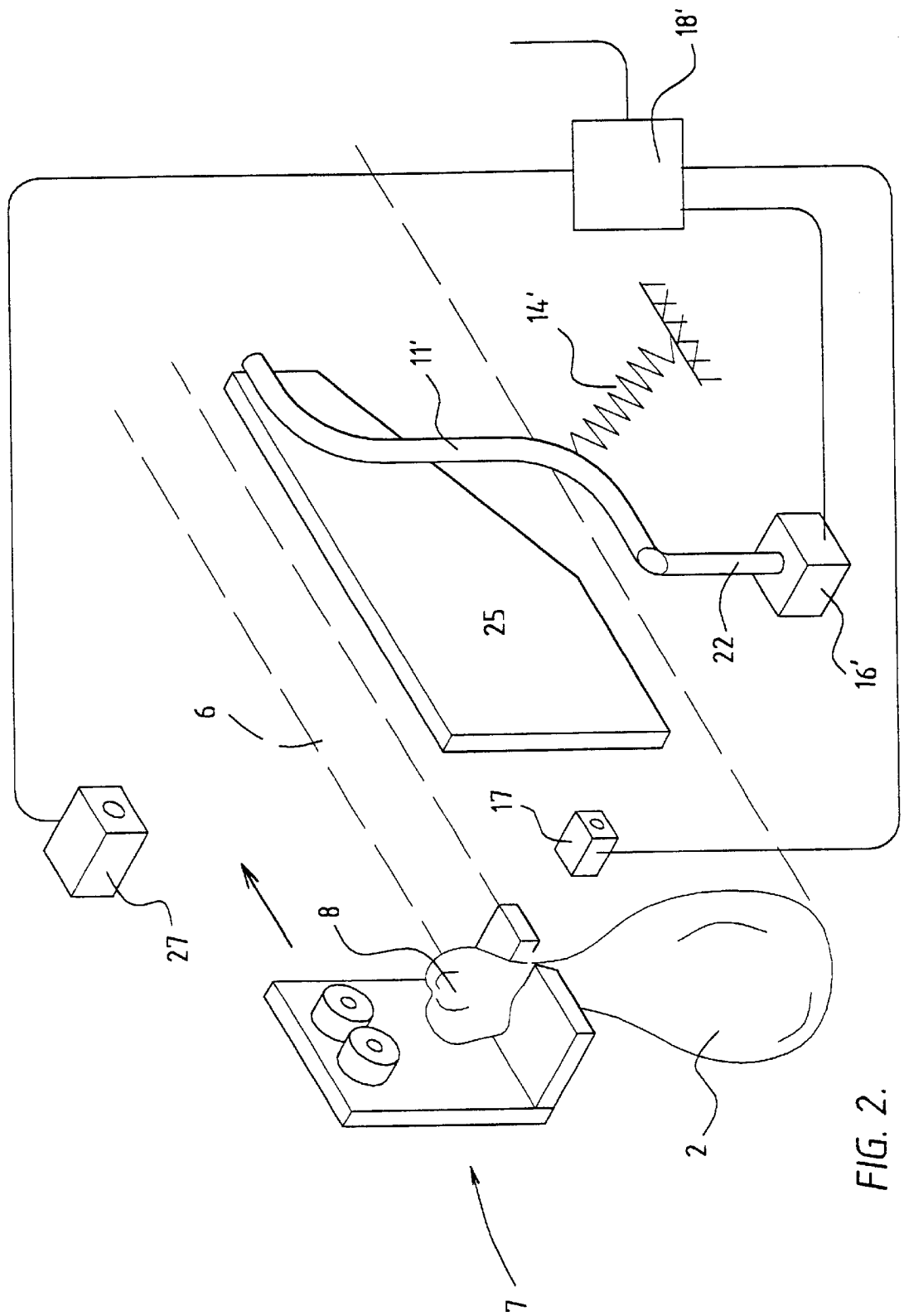
FIG. 2 shows a schematic perspective view of a second specific embodiment of the apparatus according to the invention.

FIG. 2 shows a variant of FIG. 1, where the retention means 7 are designed for carrying a drumstick 2 or other part of a fowl suspended by its tarsal joint 8, in the same manner as in FIG. 1.

The retention means 7 can be moved 20 along a conveyor track 6 (not shown) and in the process pass an observing location. Located at said observing location is obstacle 11', in the trajectory of a drumstick 2 carried by the retention means 7. The obstacle 11' has a substantially horizontal pivot 22 on one side next to said track and thence extends obliquely across the trajectory of the drumsticks 2 in the direction of movement of the drumsticks 2. Located on the other side of the trajectory of the drumsticks 2, opposite the obstacle 11', are lateral guide means 25, in this case a plate, for the drumsticks 2. These lateral guide means 25 are designed to present the passing drumstick 2 in a predefined trajectory to the obstacle 11'.

Preferably, said lateral guide means 25 are positioned so as to cause a drumstick or other fowl part suspended from the tarsal joint 8 to be forced obliquely outwards to some extent relative to the position of hanging vertically downwards, thus applying a slight flexural load to the leg bone.

FIG. 2 further shows the adjustable restoring spring 14' which pushes the obstacle 11' into its detection position. Also visible is a sensor 27 which allows a unique identification of the passing retention means 7 to be observed, so that it is possible, in control arrangement 8', for example in a computer memory, to establish whether the drumstick 2 carried by the respective retention means is or is not fractured.

The operation of the arrangement according to FIG. 2 is identical to that of the arrangement described earlier. If the drumstick has no bone fracture in the leg bone, in particular not at a short distance below the tarsal joint, the obstacle 11' will pivot away to the side as the drumstick 2 passes, this being detected by the sensor 16'. If the drumstick 2 does have a fracture, the obstacle 11' more or less remains in its position and deforms the drumstick 2 in such a way that the latter passes over the obstacle 11'. For chicken quarters, which do have a heavier section at the side facing away from the tarsal joint than drumsticks do, it may be advantageous for said heavy part to be supported to some extent as it passes along the obstacle 11'.

Figure 3:
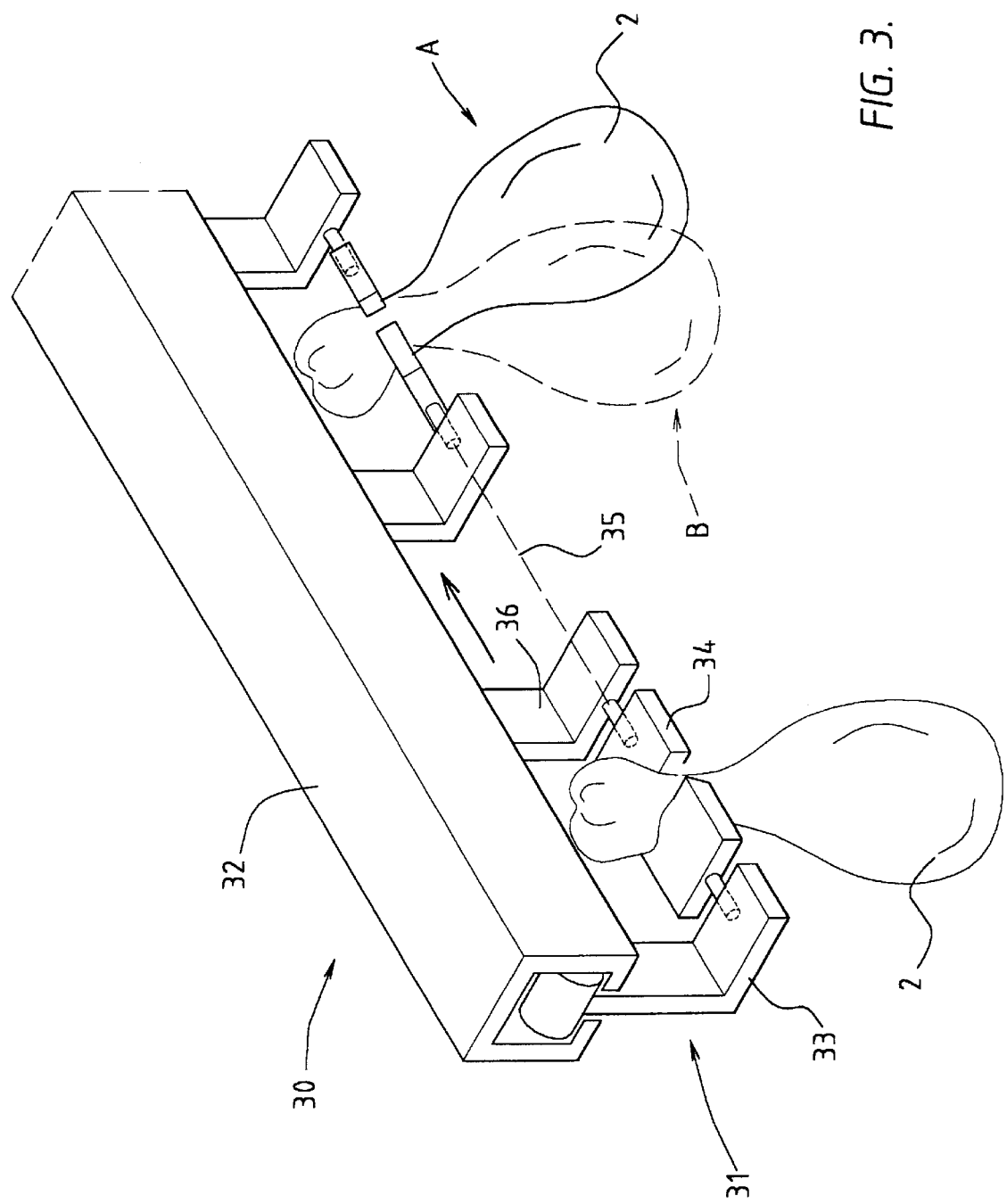
FIG. 3 shows a schematic perspective view of a third specific embodiment of the apparatus according to the invention.

FIG. 3 shows another solution for the bone fracture detection. The apparatus 30 shown comprises a conveyor arrangement 31 with retention means 33, which can be moved along a conveyor track 32, for drumsticks 2 and/or other parts of fowl.

The design of the retention means 33 is such that their section 34 which latches onto the drumstick 2 can swivel about a pivot 35 relative to the part 36 which is in contact with the conveyor track.

Located at the observing location shown in FIG. 3, past which the retention means 33 are moving, preferably at considerable speed, are tilting means (not shown), for example a guide member, which tilt the pivotable part 34, with a drumstick 2 retained therein, into such a position that the relevant bone in which the bone fracture is suspected is loaded by the weight of the drumstick 2 itself. If the bone then is fractured, it is possible in a simple manner, for example by means of a camera system, but also by means of one or more, possibly mechanical sensors, to establish whether the tilted drumstick is still straight, as indicated by A in FIG. 3 or has snapped, as indicated by B in FIG. 3.

The mechanical load acting on the leg bone can of course be considerably increased if the tilting takes place at a considerable acceleration.

In a variant which is not shown, the last-mentioned aspect is utilized by providing the conveyor track with a bend and allowing a centripetal force to act on the retained fowl parts as they pass the bend.

In another variant, the intended mechanical load is applied by causing the fowl to pass through a liquid (stream) or a gas stream, so that the bird is thereby subjected to a mechanical load.

It will also be possible to apply a torsional load to the bone to be inspected.

Figure 4:
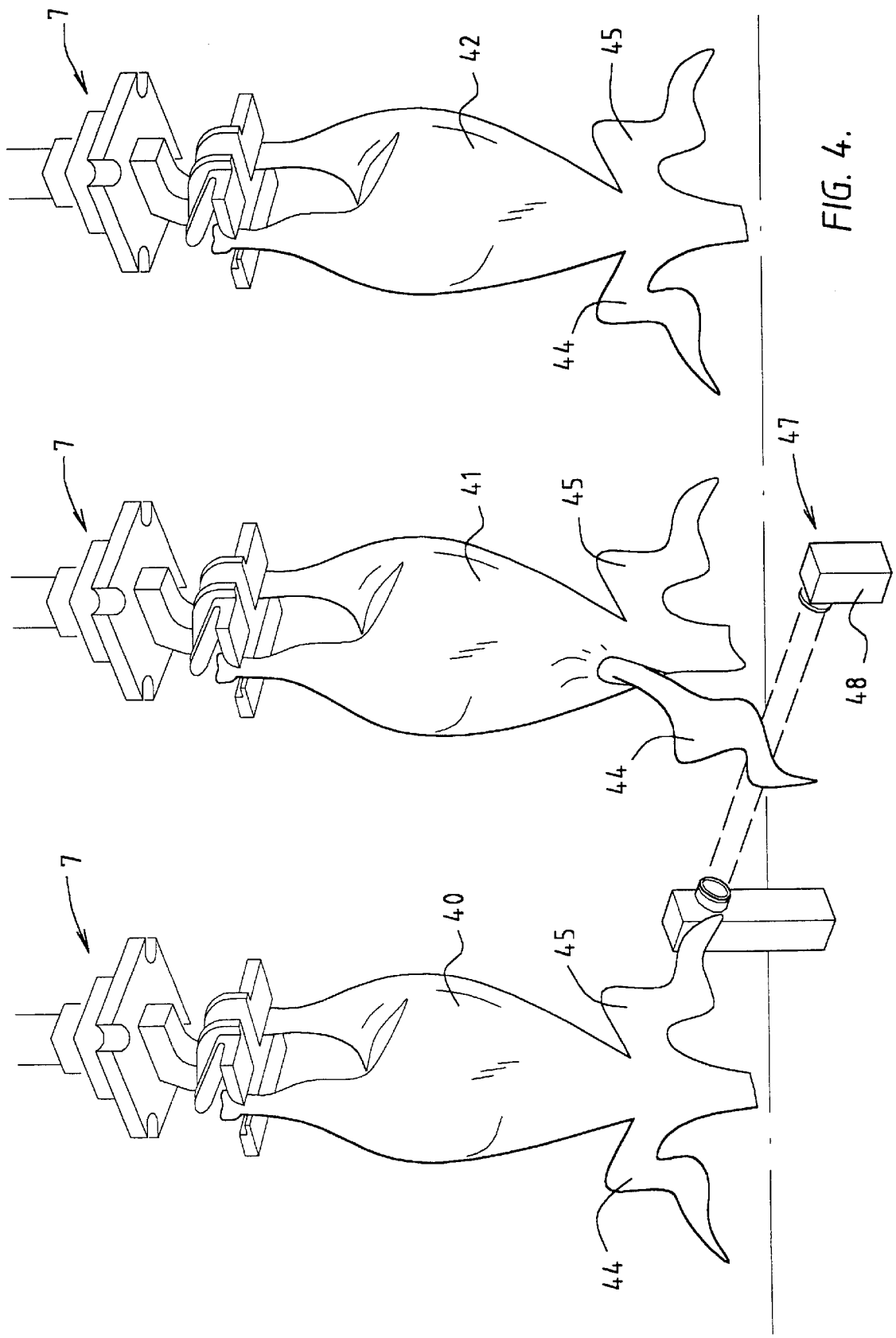
FIG. 4 shows a schematic perspective view of a fourth specific embodiment of the apparatus according to the invention.

FIG. 4 depicts three retention members 7 which can be moved along a conveyor track (not shown). Suspended from each of these retention members 7 is a slaughtered bird, in this example a chicken, 40, 41 and 42, respectively. In these chickens 40–42 the wing parts 44, 45 are still present. In processing these chickens 40–42, particularly automated processing, it is important to know whether a wing section of a chicken is broken. This is particularly true if the chicken is delivered to a facility for separating the wing sections from the body.

For this purpose, bone fracture detection means 47 are located along the conveyor track, which observe whether the shape and/or position of a wing section 44, 45 of a passing chicken deviates from a standard shape and/or position of an intact wing section. In FIG. 4 it can be clearly seen that the chickens 40 and 42 have intact wing sections, while the chicken 41 has a broken wing section 44. Because of the fracture, that wing 44 of chicken 41 hangs further down than the intact wing sections. That deviant shape and/or position of the broken wing section 44 of chicken 41 can be detected by means of a screen 48 with a transmitter which generates an (infrared) light beam, and a receiver for the light beam, the light beam being interrupted only by the passage of a broken wing section.

Figure 5:
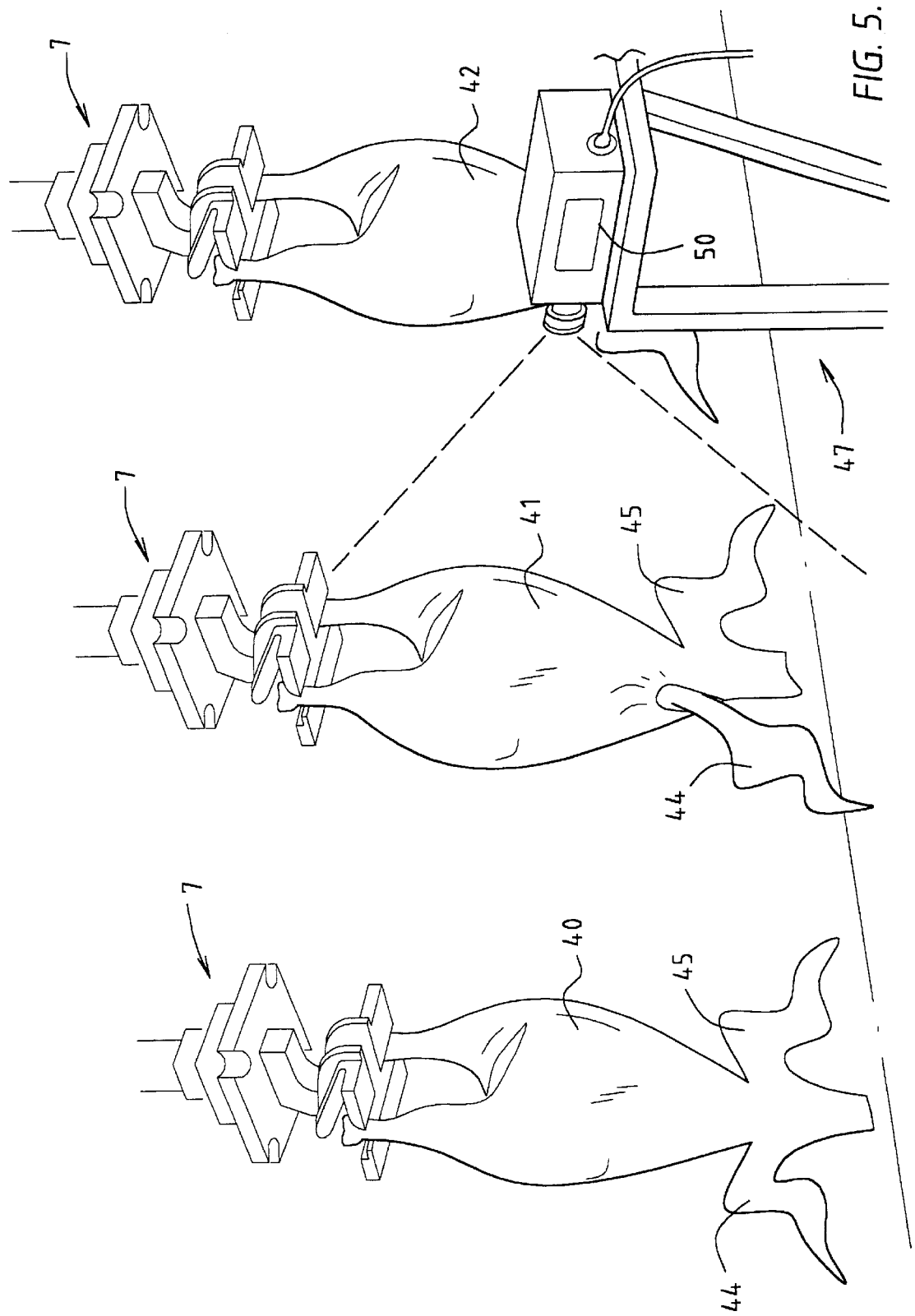
FIG. 5 shows a schematic perspective view of a fifth specific embodiment of the apparatus according to the invention.

FIG. 5 shows a variation on FIG. 4, wherein the bone fracture detection means comprise not a screen but a camera 50 which can record an entire chicken or that part of the chicken which is relevant for bone fracture detection, and which is linked to image processing means and signalling means (not shown) which compare the camera image with a predefined standard image and on the basis of that comparison establish whether a wing section is or is not broken. Here again, wing section 44 of chicken 41 is broken and the other wing sections are intact. It will be obvious that the same camera image can also be used for other purposes.

In FIGS. 4 and 5, each wing section of the passing chickens is subjected to a mechanical load, namely the weight of the wing section itself, without specific means being used. If a chicken is suspended by its legs in a retention member it will then not be clearly discernible whether there is a fracture in one of those legs.

Figure 6:
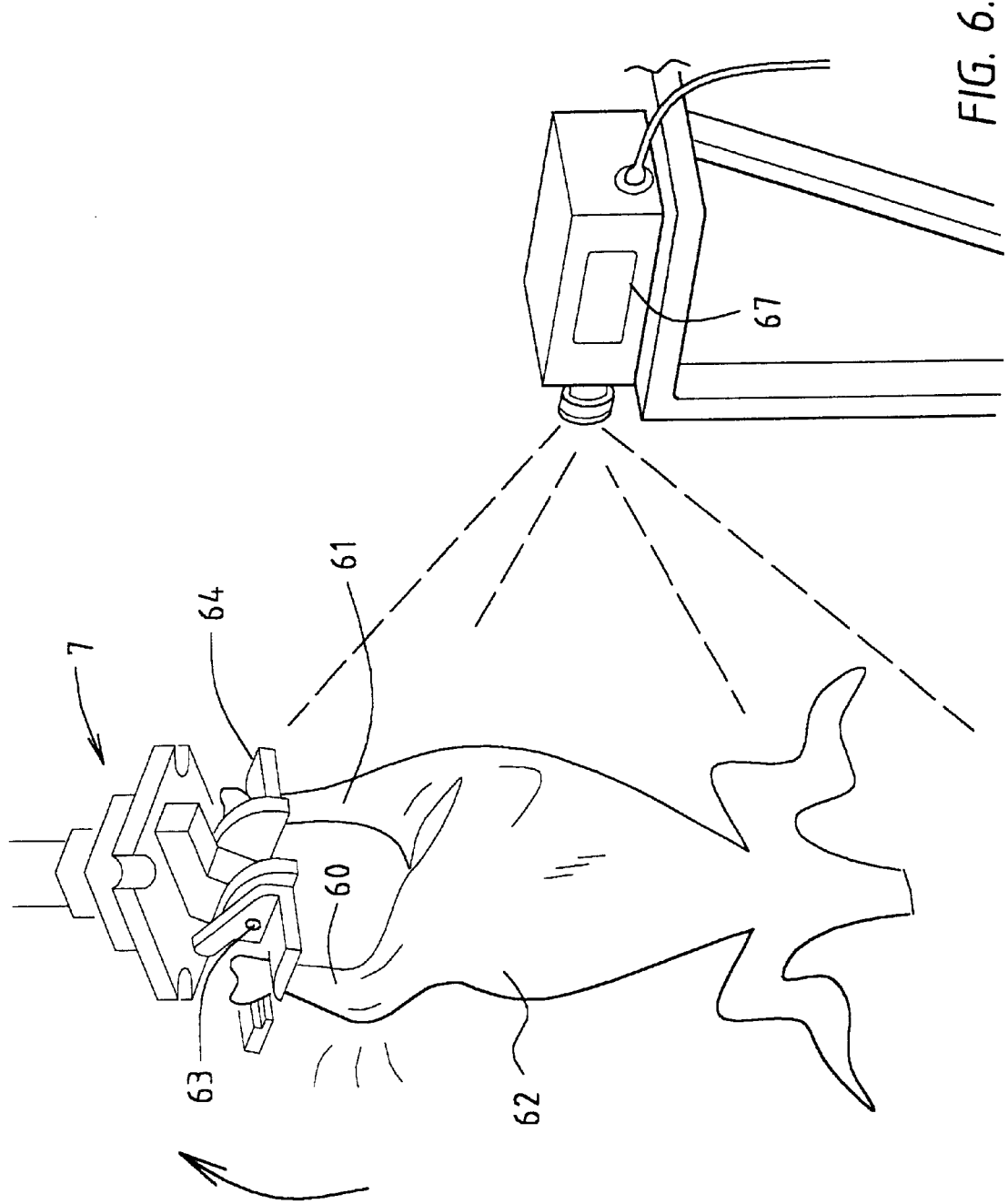
FIG. 6 shows a schematic perspective view of a sixth specific embodiment of the apparatus according to the invention.

FIG. 6 again reveals a partly shown retention member 7 and a slaughtered chicken 62 suspended therefrom by its legs 60, 61. As mentioned earlier, the retention member 7 permits tilting about a substantially horizontal tilting axis 63 of that part 64 of the retention member 7 which latches onto the legs 60, 61 below the tarsal joint. By imposing that tilt, the legs 60, 61 are subjected to a flexural load, allowing a difference in reaction to be observed between an intact leg, in this case leg 61, and a fractured leg, in this case leg 60. In this example a camera 67 has been installed which records the entire chicken or only the section of it near the legs. By suitable processing of the camera image and comparison with a standard image of an intact leg it is possible to establish that the leg 60 is fractured. Instead of a camera 67 it would also be possible, for example, to use a screen, as in FIG. 4, or a feeler, by means of which the shape of each leg upon tilting of part 64 can be detected.

What is claimed is:

1. An apparatus for detecting the presence of a bone fracture in a bone of a slaughtered animal or a part thereof, wherein the apparatus comprises:
    a. retention means for retaining an animal or part thereof;
    b. bone fracture detection means for detecting a possible fracture in a bone of the animal or part thereof, wherein the bone fracture detection means comprises:
        i. mechanical loading means for applying a mechanical load to the retained animal or part thereof so that the bone is mechanically loaded at the location of the possible bone fracture; and
        ii. observing means for observing a reaction in the orientation of the animal or part thereof resulting from the mechanical load; and
    c. signaling means for signaling the presence of a bone fracture, depending on the observed reaction.

2. An apparatus according to claim 1, wherein the observing means are adapted for observing a change or deviation in the orientation of a first portion of the animal or part thereof with respect to a second portion of the animal or part thereof onto which the retention means latch.

3. An apparatus according to claim 1, wherein the observing means are adapted to observe whether a mechanical load applied to a first portion of the animal or part thereof increases the mechanical load of a second portion of the animal or part thereof to determine whether a fracture exists between the first portion and the second portion.

4. An apparatus according to claim 1, wherein the mechanical loading means are designed for acting on the retention means in such a way that an acceleration or deceleration of the retention means is effected, causing the relevant bone to be loaded by inertial forces at the location of the possible fracture.

5. An apparatus according to claim 1, wherein the mechanical loading means comprise a liquid or a gas stream.

6. An apparatus according to claim 1, wherein the mechanical loading means are designed for applying a substantially flexural load to the bone.

7. An apparatus according to claim 1, wherein the mechanical loading means are designed for applying a substantially torsional load to the bone.

8. An apparatus for detecting the presence of a bone fracture in a bone of a slaughtered animal or a part thereof, wherein the apparatus comprises:
    a. retention means for retaining an animal or part thereof;
    b. bone fracture detection means for detecting a possible fracture in a bone of the animal or part thereof;
    c. signaling means for signaling the presence of a bone fracture, wherein the signaling means are linked to the bone fracture detection means; and
    d. a conveyor arrangement comprising a conveyor track and drive means for moving one or more retention means along the conveyor track, wherein the bone fracture detection means is positioned along the conveyor track.

9. An apparatus according to claim 8, further comprising passage detection means for detecting passage of an animal or part thereof past the bone fracture detection means.

10. An apparatus according to claim 8, further comprising a release location along the conveyor track and downstream of the bone fracture detection means and a control means for controlling the release from the retention means at the release location of an animal or part thereof having a bone fracture.

11. An apparatus according to claim 10, further comprising a mechanical recovery means at the release location, wherein the mechanical recovery means exerts a force on the animal or part thereof to separate the animal or part thereof having a bone fracture from the retention means.

12. An apparatus according to claim 8, further comprising guide means for presenting the animal or part thereof in a predetermined trajectory relative to the bone fracture detection means.

13. An apparatus for detecting the presence of a bone fracture in a bone of a slaughtered animal or a part thereof, wherein the apparatus comprises:
    a. retention means for retaining an animal or part thereof;
    b. bone fracture detection means for detecting a possible fracture in a bone of the animal or part thereof, wherein the bone fracture detection means are designed for processing a plurality of types of animals or parts thereof, and wherein the bone fracture detection means include means for observing the type of animal or part thereof examined by the bone fracture; and
    c. signaling means for signaling the presence of a bone fracture, wherein the signaling means are linked to the bone fracture detection means.

14. An apparatus according to claim 13, wherein the apparatus is designed for tailoring the detection of a bone fracture to the type of animal to be examined.

15. An apparatus for detecting the presence of a bone fracture in a bone of a slaughtered animal or a part thereof, wherein the apparatus comprises:
    a. retention means for retaining an animal or part thereof, wherein the retention means move along a conveyor track;
    b. bone fracture detection means for detecting a possible fracture in a bone of the animal or part thereof, wherein the bone fracture detection means comprises:
        i. mechanical loading means for applying a mechanical load to the retained animal or part thereof comprising a displaceable obstacle which, when in a detection position, extends at least partially in the track of the animal or part thereof retained in the retention means, wherein an animal or part thereof having no bone fracture displaces the obstacle from the detection position but an animal or part thereof having a bone fracture fails to substantially displace the obstacle from the detection position, so that the animal or part thereof can only pass the obstacle while undergoing deformation; and
        ii. observing means for observing a reaction in the orientation of the animal or part thereof resulting from the mechanical load; and c. signaling means for signaling the presence of a bone fracture, depending on the observed reaction.

16. An apparatus according to claim 15, wherein the obstacle can be pivoted with respect to a corresponding fixedly mounted frame.

17. An apparatus according to claim 15, wherein the mechanical loading means further comprise restoring means for biasing the obstacle towards the detection position.

18. An apparatus for detecting the presence of a bone fracture in a bone of a slaughtered animal or a part thereof, wherein the apparatus comprises:
   a. retention means for retaining an animal or part thereof, wherein the retention means also comprise a retention member which is designed for retaining a plurality of animal parts;
   b. bone fracture detection means for detecting a possible fracture in a bone of the animal or part thereof; and
   c. signaling means for signaling the presence of a bone fracture.

19. An apparatus for detecting the presence of a bone fracture in a bone of a slaughtered animal or a part thereof, wherein the apparatus comprises:
   a. retention means for retaining an animal or part thereof, wherein the retention means are designed for carrying a bird or part thereof while suspended from the tarsal joint of one or more legs;
   b. bone fracture detection means for detecting a possible fracture in a bone of the animal or part thereof; and
   c. signaling means for signaling the presence of a bone fracture.

20. An apparatus according to claim 19, wherein the retention means are designed for annularly encircling each leg below the tarsal joint.

21. An apparatus according to claim 19, further comprising guide means for presenting the animal or part thereof in a predetermined trajectory relative to the bone fracture detection means, wherein the guide means orient the bird or part thereof suspended from the tarsal joint into an oblique position relative to the position hanging vertically downwards, thereby applying a small flexural load to the leg bone.

22. An apparatus for detecting the presence of a bone fracture in a specific bone of a slaughtered fowl or a part of a slaughtered fowl, especially for detecting a bone fracture in the leg bone of a chicken, the apparatus comprising:
   retention means designed to retain an animal on a retention location thereof,
   mechanical loading means designed for applying a mechanical load to the retained bird, so that the relevant bone is subjected to mechanical loading at the location of the possible bone fracture,
   observing means for observing a change or deviation resulting from the mechanical load in the orientation of a part of the bird with respect to that part of the bird onto which the retention means latch, and
   signalling means which are linked to the observing means and which—if a change in the orientation has been observed which exceeds a predetermined value—signal a bone fracture.

23. An apparatus for detecting the presence of a bone fracture in a bone of a slaughtered animal or a part thereof, wherein the apparatus comprises:
   a. retention means for retaining an animal or part thereof at a retention location on the animal or part thereof;
   b. bone fracture detection means for detecting a possible fracture in a bone of the animal or part thereof, wherein the bone fracture detection means comprises:
      i. mechanical loading means for applying a mechanical load to the retained animal or part thereof, so that the bone is mechanically loaded at the location of the possible bone fracture; and
      ii. observing means for observing a reaction in the orientation of the animal or part thereof resulting from the mechanical load;
   c. signaling means for signaling the presence of a bone fracture, depending on the observed reaction; and
   d. a conveyor arrangement comprising a conveyor track and drive means for moving one or more retention means along the conveyor track, wherein the bone fracture detection means is positioned along the conveyor track.

24. An apparatus according to claim 23, wherein, upon mechanical loading by the mechanical loading means, the animal or part thereof without a fracture in the bone will not substantially deform but an animal or part thereof having a bone fracture will deform.

25. An apparatus according to claim 23, wherein the mechanical loading means are designed for applying a substantially flexural load to the bone and wherein the flexural load is oriented substantially in the plane of the trajectory of the animal or part thereof.

26. An apparatus according to claim 23, wherein the mechanical loading means are designed for applying a substantially flexural load to the bone and wherein the flexural load is oriented substantially orthogonal to the plane of the trajectory of the animal or part thereof.

27. An apparatus according to claim 23, wherein the retention means are tiltably mounted with respect to the conveyor arrangement and wherein the mechanical loading means comprise tilting means which tilt the retention means, together with an animal or part thereof retained therein, into such a position that the bone in which the bone fracture is suspected is loaded by the animal's or part thereof's own weight.

28. A method for detecting the presence of a bone fracture in a slaughtered animal or part thereof comprising:
   a. retaining the animal or part thereof in a retention means;
   b. applying a mechanical load to at least a portion of the animal or part thereof;
   c. observing for deformation of the mechanically-loaded portion of the animal or part thereof, and
   d. signaling whether a bone fracture exists, depending on the observation.

29. An apparatus for detecting the presence of a bone fracture in a bone of a slaughtered animal or a part thereof, wherein the apparatus comprises:
   a. a shackle for retaining an animal or part thereof, wherein the shackle moves along a path; and
   b. a displaceable obstacle which, when in a detection position, extends at least partially in the path of the animal or part thereof retained in the shackle, wherein an animal or part thereof having no bone fracture displaces the obstacle from the detection position but an animal or part thereof having a bone fracture fails to substantially displace the obstacle from the detection position.

30. The apparatus of claim 29, further comprising a sensor for sensing displacement of the obstacle from the detection position.

31. The apparatus of claim 29, further comprising a passage detector for detecting passage of an animal or part thereof past the obstacle.

* * * * *